United States Patent [19]

Herman

[11] 4,137,992
[45] Feb. 6, 1979

[54] TURBOJET ENGINE NOZZLE FOR ATTENUATING CORE AND TURBINE NOISE

[75] Inventor: Gerald T. Herman, Seattle, Wash.

[73] Assignees: The Boeing Company, Seattle, Wash.; Aeritalia S.p.A., Naples, Italy

[21] Appl. No.: 755,836

[22] Filed: Dec. 30, 1976

[51] Int. Cl.$^2$ .............................................. F01N 1/00
[52] U.S. Cl. .................................. 181/213; 181/269; 181/286; 181/292; 181/293
[58] Field of Search ....................... 239/265.11, 265.13; 60/685, 687, 697; 181/213, 215, 216, 217, 220, 221, 222, 224, 232, 243, 264, 265, 268, 270, 272-273, 241, 288-293

[56] References Cited

U.S. PATENT DOCUMENTS

| 1,820,972 | 9/1931 | Haas | 181/264 |
| 2,916,101 | 12/1959 | Naman | 181/224 |
| 2,988,302 | 6/1961 | Smith | 181/220 |
| 3,542,152 | 11/1970 | Adamson et al. | 181/214 |
| 3,655,009 | 4/1972 | Hilbig | 181/220 |
| 3,819,009 | 6/1974 | Motsinger | 181/292 |

FOREIGN PATENT DOCUMENTS

935119  8/1963  United Kingdom ............... 181/33 HB

Primary Examiner—L. T. Hix
Assistant Examiner—Benjamin R. Fuller
Attorney, Agent, or Firm—Christensen, O'Connor, Johnson & Kindness

[57] ABSTRACT

Core noise, a low frequency noise component believed to be partly caused by the combustion processes within the engine, and turbine noise, a higher frequency noise component caused by the interaction of high velocity gases with the engine's turbine, are attenuated by noise absorbing structures that are disposed within the engine's nozzle and that in part define the physical geometry of the nozzle duct. The nozzle is formed of an outer sleeve and an inner generally bulb-shaped plug which are coaxially arranged to define an annular nozzle duct that channels the flow of gases rearwardly from the outlet of the engine's turbine. The plug has a hollow interior that is partitioned into a plurality of cavities that communicate with the nozzle duct via perforations provided in an outer wall of the plug. The size, shape and positioning of the interior cavities and outer plug wall perforations are selected so as to absorb noise energy existing in the exhaust gases, both at the relatively low frequencies characteristic of core noise and at the relatively higher frequencies characteristic of turbine noise.

14 Claims, 11 Drawing Figures

TURBOJET ENGINE NOZZLE FOR ATTENUATING CORE AND TURBINE NOISE

BACKGROUND OF THE INVENTION

In general, the present invention is concerned with the reduction of noise in turbojet engines and in particular with the reduction of core and turbine noise by attenuating both of these noise components within the nozzle of a turbojet engine.

For a number of years there has been a concentrated effort in the aircraft industry to reduce the noise produced by commercial aircraft because of the disturbing effect it has on the inhabitants of communities located near those airports used by commercial carriers. Numerous studies of aircraft noise have identified the components that make up the total perceivable noise and steps have been made to eliminate such components or at least reduce intensity. For example, the aircraft industry has been successful in reducing jet noise, which is a noise produced by the mixing of high velocity exhaust gases with atmospheric air by switching to high-bypass turbofan engines. Such engines have lower fan and core exhaust velocities, and hence jet noise which is directly proportional to the exhaust velocities has been greatly reduced. Noise originating from the fan of turbofan engines has been partially suppressed by the use of acoustically absorbant liners strategically placed within the fan casing and fan exhaust duct. Similarly, turbine noise has been minimized by using acoustically absorbant liners located within the core exhaust nozzle of the turbofan engine.

However, reductions in jet, fan and turbine noise components have not yielded the overall reduction in noise that was expected by researchers. Further studies stimulated by this unexpected result have led to the discovery of still another noise component, namely, core noise, as reported by Bushell, K. "A Survey of Low Velocity Coaxial Jet Noise with Application to Jet Prediction", Symposium of Aerodynamic Noise, Sept. 1970. Although the exact origin of the core noise is still not well understood, it has been defined as the residual noise component that is left over after jet, fan and turbine noise have been identified and subtracted from the total rearwardly radiated noise. So far as the origin of core noise is understood, it is believed to include contributions from the combustion process within the combustor, interaction of the flow of gases from the combustor and the blades of the turbine and general flow noise as the exhaust gases flow past the structural parts of the engine's turbine and nozzle. The sound level verses frequency spectrum of core noise is essentially broadband, peaking at a relatively low frequency of around 200 to 800Hz where most of the energy of the core noise is concentrated.

Since most of the core noise energy occurs within a frequency range that is substantially lower than the range of frequencies of turbine noise, the low frequency end of which is typically around 2,000Hz, commonly used acoustically absorbant nozzle linings, tuned to the turbine frequency range, do not provide appreciable attenuation of core noise. Moreover, modification of the nozzle's acoustical lining in order to absorb the core noise is likely to diminish the effectiveness of the lining for attenuating the higher frequency turbine noise components. Thus, one of the problems in reducing core noise, is the fact that any new or modified acoustically absorbant structure for the nozzle must be compatible with noise absorbant structures tuned to the higher frequency turbine noise. A related problem is the design criteria imposed by limited space available within the engine's nozzle for placement of both core and turbine sound absorbing structures. While in other environments it may be possible to use two physically separate, serially arranged sound absorbing structures, one tuned to the core noise frequencies and the other tuned to the turbine noise frequencies, the space limitation within the nozzle does not permit such cascading of structures.

Furthermore, the high pressures, high temperatures and severe temperature gradients that exist within the core exhaust nozzle impose additional constraints on the types of acoustically absorbant structures that can be used. For example, it is not practical to use sound absorbing structures that employ fiberous material because of the susceptibility of such material to disintegration in the presence of the high gas temperatures and high energy vibration, i.e., high level sound. Also, large temperature gradients, existing within the nozzle, especially during engine start-up cause differential thermal expansion of the metal parts and the acoustically absorbant structures must be able to accomodate such temperature effects without developing dangerous localized stresses within the nozzle.

Other nozzle design criteria such as duct geometry, the amount of drag caused by the surface characteristics of the duct wall, overall nozzle size and weight, nozzle discharge capability and ease of fabrication impose further constraints on the type of the noise absorbing structure that can be employed.

Accordingly, one object of the present invention is to provide a nozzle assembly for the core of a turbojet engine, wherein such assembly includes sound absorbing structure that is effective in attenuating both core noise and turbine noise.

A further object of the present invention is to provide a turbojet core nozzle assembly that has an acoustically absorbant structure which is compatible with certain minimum stress design requirements typically specified for nozzles of this general type.

Still another object of the present invention is to provide a turbojet core nozzle assembly that has the above-mentioned acoustically absorbant characteristics and which is compatible with other nozzle design criteria including duct geometry, overall size, nozzle weight, nozzle discharge and thrust, and ease of fabrication.

SUMMARY OF THE INVENTION

Briefly, the invention is based in part on the recognition that the nozzle plug which is commonly used in engines capable of powering commercial transports, has a size that is suitable for containing cavities of the relatively large volume needed for attenuating low frequency core noise. It is also based on the discovery that low frequency core noise absorbing cavities within the plug can be structurally integrated with smaller volume cavities, tuned to absorb turbine noise, in a cooperative manner that yields an overall attenuation of noise that is more effective than if the low and high frequency cavities are physically separated. In particular, the present invention provides a noise attenuating nozzle assembly for attachment to a turbojet propulsion engine wherein the nozzle assembly comprises an annularly shaped sleeve having an inner wall, and a plug having an outer wall of generally circular cross section which is disposed coaxially within the sleeve. The cross section of the plug's outer wall varies in diameter along the direction of the axis so as to define an annular exhaust duct of variable cross sectional area between the inner wall of the sleeve and the outer wall of the plug. The sleeve and plug have forward ends that are adapted for connection to the engine so that the nozzle duct extends rearwardly from the engine's annular exhaust port. The plug has a hollow interior and is divided by partitions into a plurality of separate cavities and the outer wall of the plug is perforated so as to place the cavities in acoustical communication with the gases in the nozzle duct. The cavities are arranged and variously dimensioned to coact with the outer wall perforations so as to receive, absorb and thereby attenuate sound energy existing in both the relatively low core noise frequency range and in the relatively higher turbine noise frequency range.

In one preferred form of the invention, the plurality of plug cavities include a first set of cavities that are located between the outer wall of the plug and an inner partitioning wall that is shaped like the plug's outer wall and is spaced radially inwardly therefrom. Extending generally radially between the outer and inner walls are a plurality of partitions that divide this space into relatively small volume cells that define the first set of cavities. Sound in the nozzle duct is coupled into these cavities through perforations in the plug's outer wall. The first set of cavities function as quarter wave type absorbers and are dimensioned so as to be tuned to the relatively high frequencies of the turbine noise.

Within the remaining hollow interior of the plug, an additional plurality of partitions are arranged to form a second set of cavities which are substantially larger than the first set of cavities and are tuned to absorb the relatively lower frequency core noise. In one preferred form of the invention, core noise is coupled into the second set of cavities through the first set of cavities via the perforations in the plug's outer wall and the addition of perforations in the above-mentioned inner partitioning wall.

To further attenuate the turbine and core noise, the sleeve of the nozzle includes a hollow interior, which like the hollow interior of the plug is divided by partitions into sound absorbing cavities that communicate with the duct through perforations in an inner wall of the sleeve and in cooperation with such perforations, receive, absorb and thereby attenuate core and turbine noise.

The components of the plug and sleeve are constructed and assembled in a manner that yields a lightweight nozzle which is economical to fabricate, minimizes the problems of localized stresses due to large temperature gradients, has acceptable friction drag characteristics and has acceptable flow discharge capability.

In another embodiment of the invention, the cavities of the plug and the perforations within the plug's outer wall are so arranged about the circumference of the plug so as to absorb noise radiated from the nozzle in a particular direction or directions.

In still another embodiment of the invention, the plug is used in a mixed-flow type nozzle of a turbofan engine. The relatively large sound absorbing cavities, i.e., the second set, communicate with the nozzle duct through perforations in the plug's outer wall that are located upstream from a transversely extending mixing plane at which the fan air flow and turbine exhaust gases are mixed within the nozzle. The relatively smaller cavities, i.e., the first set, and the perforations in the plug's outer wall that communicate such cavities with the nozzle duct are located downstream of the mixing plane. Since a greater concentration of core noise exists in the turbine exhaust prior to such exhaust being mixed with the fan flow, optimum attenuation of the core noise is achieved by the disposition of the larger cavities and associated perforations in a region of the nozzle upstream of the mixing plane to absorb core noise before it is mixed into the fan flow. The turbine noise from the turbine exhaust and fan noise from the fan flow, which are in the same general frequency range, are absorbed in the relatively smaller cavities and associated perforations located on the plug, aft of the mixing plane.

To provide a complete disclosure of the invention, reference is made to the appended drawings and following description of several particular and preferred embodiments.

DETAILED DESCRIPTION

Figure 1:
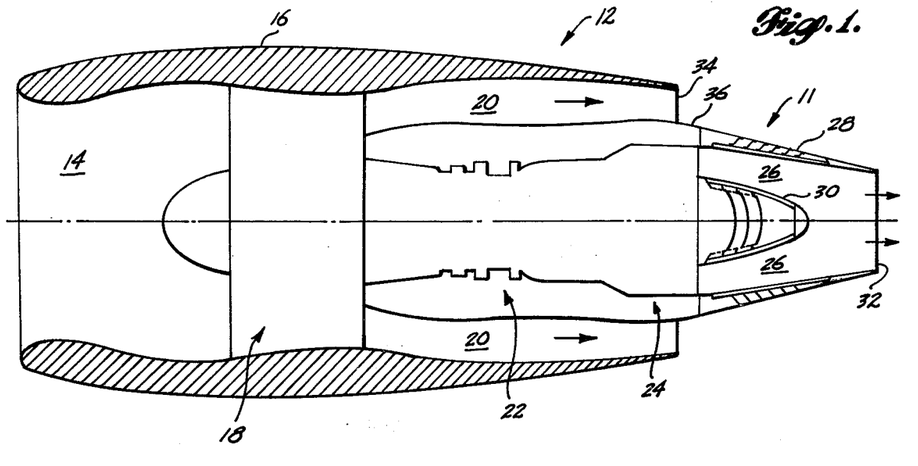
FIG. 1 is a plan view in longitudinal, vertical section of a turbofan engine equipped with a noise attenuating core exhaust nozzle assembly of the invention.

With reference to FIG. 1, a noise attenuating nozzle 11 embodying the invention is adapted for attachment to the aft end of the core of a high by-pass turbofan engine 12. Briefly, engine 12 includes an air intake 14 at a forward end of an engine housing 16 for channeling intake air into a compressor and fan stage 18. A portion of the intake air is channeled to a fan (not shown) in stage 18 and is propelled by the fan rearwardly through an annular fan duct 20. The remaining air is channeled into the core of the engine including a decompressor (not shown) in stage 18 where it is compressed to a high pressure and injected into a combustor stage 22 where the compressed air is mixed with fuel and burned. High temperature and high pressure gases produced by the combustion are channeled through a turbine stage 24 that includes a pair of turbines (not specifically shown) having coaxially arranged forwardly extending shafts for turning the compressor and the fan of stage 18.

Turbine exhaust gases from turbine stage 24 are ejected into an annular shaped and rearwardly extending duct 26 of nozzle 11 that is defined between the inner wall of a nozzle sleeve 28 and an outer wall of a round plug 30 mounted coaxially within sleeve 28. The fan air flow is discharged through an open annular end 34 of fan duct 20 that is defined between engine housing 16 and a housing 36 of turbine stage 24. Propulsion from the engine is obtained by thrust forces produced by the discharge of turbine gases from end 32 of nozzle 11 and of air from end 34 of duct 20.

Figure 2:
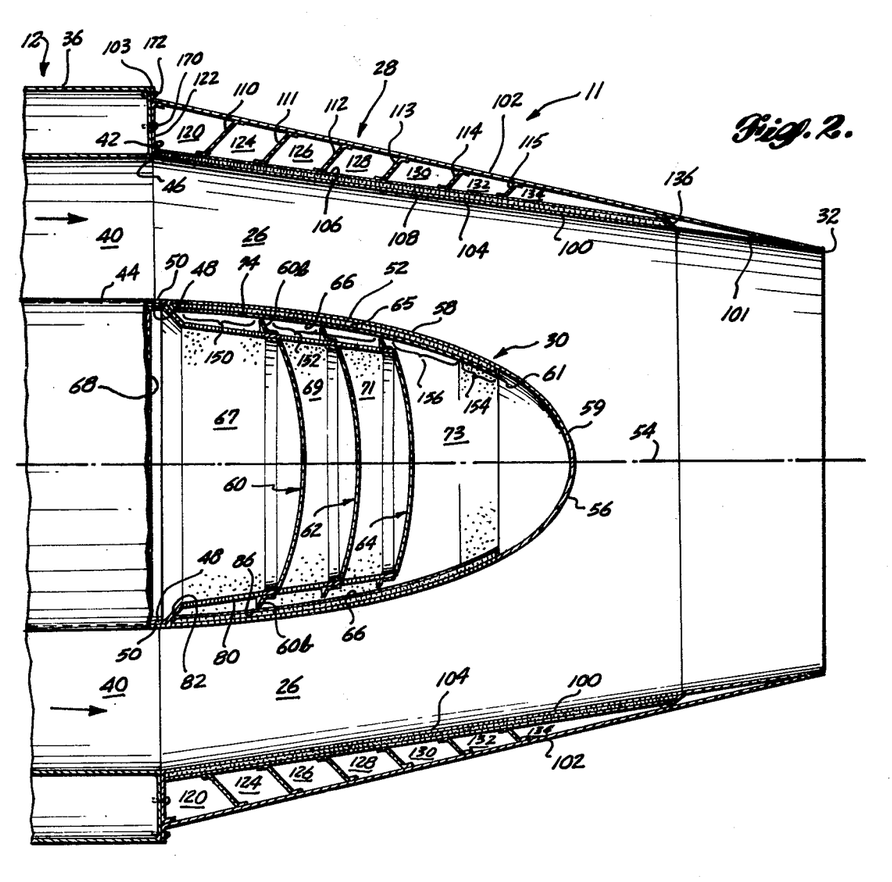
FIG. 2 is an enlarged sectional view of the nozzle assembly as it is shown in FIG. 1.

As shown in FIG. 2, nozzle 11 is adapted for attachment to the aft end of engine 12 so that annular duct 26 forms a rearward duct extension of an annular turbine outlet 40 defined between a cylindrical portion of housing 36 of turbine stage 24 that terminates at an axial end 42 and a cylindrical hub fairing 44 of turbine stage 24 that terminates with a rearwardly projecting cylindrical mounting flange 48. A forward annular end 46 of sleeve 28 of nozzle 11 is removably bolted to end 42 for housing 24 and a cylindrically shaped flange 50 at a forward end of plug 30 is removably bolted to flange 48 of hub fairing 44 as described in greater detail below in connection with FIG. 6.

Plug 30 has an outer wall 52 that is circular in cross section and has an axis 54 coincident with the center line of engine 12 and nozzle 11. The diameter of the plug's outer wall 52 varies along the length of axis 54 such that it is greatest at the forward end of the plug and decreases in the aft direction, first gradually and then more rapidly in a bullet shape and terminates in a blunt aft end 56.

Over most of the surface area of plug 30, outer wall 52 is formed by an outer metal skin of an all-metal acoustical liner structure 58 which extends from the forward end of plug 30 to an aft terminus 61 located forward of plug end 56 which is formed by an cup-shaped metal end piece 59. The liner structure 58 together with a set of three disk-shaped coaxially arranged and axially spaced partitions 60, 62 and 64 serve to divide the hollow interior of plug 30 that lies inwardly of outer wall 52 into a plurality of sound absorbing cavities. These cavities are variously sized and arranged to absorb noise energy within the frequency ranges of the turbine noise and core noise.

Structure 58 includes outer wall 52, an inner wall 66 that is spaced radially inwardly from outer wall 52 by an intervening lightweight metal core structure 65, such as a metal honeycomb structure which has open ended cells that are arranged so that sound energy can pass freely between walls 52 and 66.

A first set of cavities is defined in liner structure 58 in which such cavities are bounded by walls 52 and 66 and the cells of honeycomb structure 65 and are effective as quarter wave absorbers tuned to the relatively higher frequency range that embraces the turbine noise. Sound energy in nozzle duct 26 is coupled into this first set of cavities through perforations formed in outer wall 52 (shown in FIG. 5).

A second set of cavities is defined within plug 30 by partitions 60, 62, and 64. Cavities of this second set act as Helmholtz sound absorbing cavities which are tuned to the relatively lower frequency range that embraces the core noise. Sound energy in duct 26 is coupled into these Helmholtz cavities through liner structure 58 by means of the perforations in outer wall 52 and additional perforations provided in inner wall 66. In particular a first Helmholtz cavity 67 is defined between a transversely disposed end wall 68 of hub fairing 44 and the forward partition 60. Similarly, additional Helmholtz cavities 69, 71 and 73 are defined, in succession, between partitions 60 and 62, partitions 62 and 64, and partition 64 and end piece 59 of plug 30.

The radially outermost edges of partitions 60, 62 and 64, such as edge 74 of partition 60, are nested inside of liner structure 58 so as to be in close proximity to but slightly spaced from the inner wall 66 of liner structure 58. Thus, inner wall 66 of structure 58 serves as the outer circumferential boundary of cavities 67, 69, 71 and 73 and the perforations in wall 66 together with the perforations in outer wall 52 serve as the openings to the Helmholtz cavities. It is observed that cavities 67, 69, 71 and 73 differ from a classical Helmholtz cavity, in that they do not have a single opening entering into a cavity at a single, well-defined location. Nevertheless, cavities 67, 69, 71 and 73 behave like Helmholtz cavities, receiving, dissipating and thus absorbing sound energy and they can be tuned by well-known trial and error techniques to absorb the particular frequency components that make-up the core noise.

Partitions 60, 62, and 64 are made of metal and are preferebly semispherical in shape and are supported within the hollow interior of plug 30 by a frusto-conical support 80 made of metal and coaxially arranged in plug 30 with the smaller diametered end of support 80 projecting rearwardly. The larger diameter end of support 80 is formed for attachment to hub fairing 44 and includes a forwardly and outwardly flared portion 82 and a cylindrical flange portion 84 that projects forwardly from portion 82. Support 80 enables partitions 60, 62 and 64 to be held in place without requiring them to be attached to structure 58 and as such support 80 does not interact acoustically with cavities 67, 69, 71 and 73. For this reason, support 80 is perforated with openings sized and spaced so that it is virtually transparent to acoustical energy of the frequencies of interest, namely the frequencies of turbine noise and core noise. For ease of fabrication, partitions 60, 62 and 64 are each formed in two sections, an inner semispherical section, for example inner section 60a of partition 60, that is nested within support 80, and an outer annular section, such as section 60b, that fits over the outer surface of support 80. The inner and outer sections of each of partitions 60, 62 and 64 are attached to support 80 by means such as brazing.

Partitions 60, 62, and 64 and support 80 are dimensioned relative to lining 58 so that the radially outermost edges of the partitions, such as edge 86 of partition 60, is spaced slightly radially inwardly of the inner wall 66 of the structure 58. By supporting the partitions 60, 62 and 64 with support 80 and spacing the outer edge of the partition from structure 58, the assembly avoids problems of fretting, i.e., mechanical erosion due to vibration, and large local stresses due to temperature gradients that would be expected to occur in brazed joints or welds joining the partitions to structure 58. Large temperature gradients occur due to the difference in temperature between the hot exhaust gasses flowing in duct 26 and the relatively cooler air inside plug 30, primarily during engine start-up.

With further reference to FIG. 2, sleeve 28 of nozzle 11 is formed of a radially innermost wall 100 having a hollow frusto-conical shape that has its smaller diameter end projecting rearwardly, and a radially outermost wall 102 of hollow frusto-conical shape, spaced radially outwardly from wall 100. Wall 102, like wall 100, has its smaller end projecting rearwardly but has a slightly greater pitch relative to axis 54 than wall 100. Thus, sleeve 28 has a hollow, annular, interior defined between walls 100 and 102 which has its greatest radial dimension adjacent the larger ends of walls 100 and 102, and decreases to a smaller radial dimension as walls 100 and 102 converge adjacent the aft end 32 of sleeve 28.

Inner wall 100 of sleeve 28 is provided by a radially innermost metal skin of an acoustical liner structure 104 (see FIG. 4) that lines nozzle duct 26. In addition, structure 104 has another metal skin providing a wall 106 that is spaced radially outwardly from wall 100 by an intervening, lightweight, metal core structure 108, such as a metal honeycomb structure, which like core 65 of structure 58 is formed and positioned to pass acoustical energy between walls 100 and 106.

Figures 3, 4, 5:
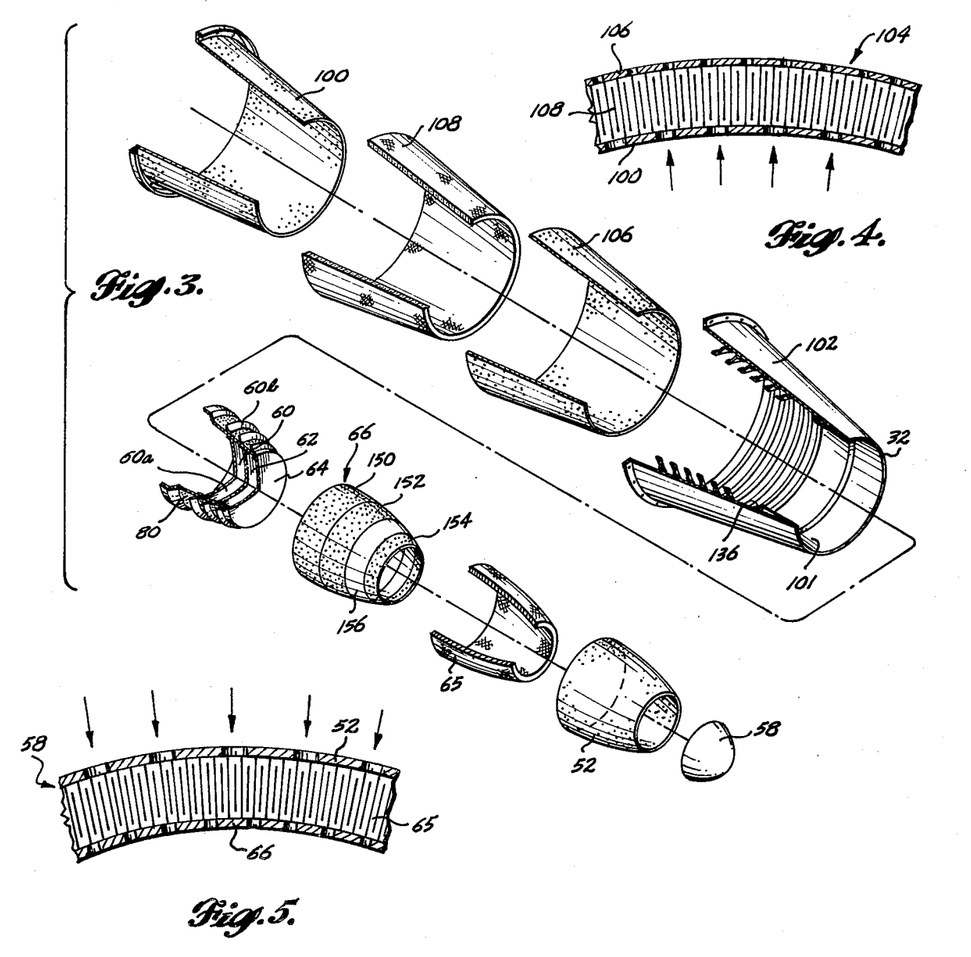
FIG. 3 is an exploded view of the nozzle assembly of FIG. 1 in which portions of the components are cut away for clarity.
FIG. 4 is a detail view, shown in transverse section, of a double-wall lining of an annularly shaped sleeve of the nozzle assembly of FIG. 1 in which the radially innermost wall of the lining forms the inner wall of the sleeve.
FIG. 5 is a detail view, shown in transverse section, of a double-wall lining of a round plug of the nozzle assembly of FIG. 1 in which the radially outermost wall of the lining forms the outer wall of the plug.

Liner structure 104 including its core structure 108 and wall 106 provides together with a plurality of annular partitions 110-115 for dividing the hollow interior of sleeve 28 into a plurality of variously sized sound absorbing cavities. In particular, structure 104 serves in a manner similar to liner structure 58 of plug 34 to define a set of relatively small cavities between inner wall 100 and wall 106. These cavities receive and absorb noise energy from duct 26 through perforations in wall 100 and are tuned to the relatively high frequencies of turbine noise.

Partitions 110-115 define a second set of cavities of relatively larger cavity size. Cavities of this second set are tuned to the lower frequencies of the core noise which is coupled into these cavities via liner structure 104. For this purpose, wall 106 of structure 104 is perforated with openings of size and spacing selected relative to the perforations in wall 100 so as to couple the lower frequency core noise from duct 26 into the second set of cavities without diminishing the effectiveness of structure 104 as a quarter wave absorber of the higher frequency turbine noise.

The radially outermost portion of each of partitions 110-115 is provided with a flange that is attached to the inner surface of wall 102 by such means as brazing. From these points of attachment partitions 110-115 sloped radially inwardly and forwardly to flanged inner portions that are unattached and are spaced slightly apart from wall 106 of structure 104. A first sound absorbing cavity 120 is thus defined between forwardmost partition 110 and a rearwardly facing surface of an annular mounting flange 122 that extends generally radially outwardly from a forward end of wall 100. Flange 122 and a similar flange 103 at the forward end of wall 102 form end 46 of sleeve 28. The remaining interior of sleeve 28 is divided into sound absorbing cavities 124, 126, 128, 130, 132 and 134 by partitions 111, 112, 113, 114 and 115, wherein the aft cavity 134 is defined between partition 115 and an annular wall 136 that extends in a radially outwardly and forwardly direction from inner wall 100 to outer wall 102.

It is observed that each of cavities 120, 124, 126, 128, 130, 132 and 134 extends about the full circumference of nozzle 11 within sleeve 28 and thus encompasses a substantial volume. In particular the volumes of the sound absorbing cavities 120-134 within sleeve 28 are sufficiently large that they can be tuned, as Helmholtz cavities, to the same relatively low frequency ranges to which cavities 67, 69, 71 and 73 of plug 30 are tuned.

The fabrication of the acoustical liner structures 58 and 104 of plug 30 and sleeve 28, respectively, are best described with reference to FIGS. 3-5. Structure 58 is formed entirely of metal and is fabricated by forming the honeycomb core 65 in the frusto-conical shape and then shaping and attaching the perforated walls 52 and 66 to core 65 by means of a suitable metal-to-metal bonding technique, such as brazing. Wall 52 is formed of sheet metal that is perforated by a die punching in which the perforations are of uniform size and spacing as described more fully herein to provide a percentage open area (POA) that is uniform over the entire surface of wall 52. Inner wall 66 is similarly perforated by die punching, however, in this instance the perforations are disposed and dimensioned to provide circumferential sections of different POA, designated in FIG. 3 as sections 150, 152 and 154, and an imperforate circumferential section 156. Section 150 is in registration with cavity 67, section 152 spans cavities 69 and 71, and sections 154 and 156 are in registration with cavity 73.

The imperforate section 156 restricts the effective opening to cavity 73 to prevent the recirculation of nozzle flow energy into and out of cavity 73 at different axial locations along wall 66 because such recirculation decreases the effectiveness of the cavity as a sound attenuator and causes nozzle thrust losses.

The thickness of core structure 65 and the particular POAs for outer wall 52 and inner wall 66 will vary depending upon the frequencies of sound that are to be absorbed and depending on the particular configuration and dimensions of the plug 30 and sleeve 28. In one nozzle that has been tested, liner structure 58 had an overall axial length of approximately 21.0 inches, a minimum radius of 6.0 inches at aft terminus 61, and a maximum radius of approximately 10.0 inches at the forward end. Wall 52 was perforated to have a uniform POA of 19% with the diameters of the perforated openings being 0.03 inches. The thickness of honeycomb 65 (radial dimension) was 0.50 inches and the cross section of each open cell of the honeycomb was ⅜ sq. inches. Section 150 of inner wall 66 had a POA of 19%; section 152 had a POA of 8%; and section 154 had a POA of 19%. Support structure 80 had a POA of 34%, selected so as to be transparent to acoustical energy at the frequencies to which cavities 67, 69 and 71 are tuned.

For a nozzle assembly 11 having a plug 30 constructed with the foregoing exemplary dimensions, each of cavities 67, 69, 71 and 73 is tuned to receive and absorb noise components having frequencies in a range from 200 to 800Hz which embraces the highest concentrations of the core noise spectrum. Furthermore, the foregoing dimensions of liner structure 58 enable structure 58 to couple the noise energy at these relatively low frequencies into cavities 67, 69, 71 and 73 and at the same time enable structure 58 to act as a quarter wave absorber of sound energy at frequencies in a range from 2000-8000Hz which embraces the highest concentrations of the turbine noise spectrum.

It is observed that liner structure 58, in addition to its acoustical properties, forms a lightweight structural shell for plug 30. It has been found that structure 58 provides by itself adequate strength for withstanding the exhaust pressures that are developed in duct 26. The sandwiching of honeycomb core structure 65, which is itself a very lightweight structure, between relatively thin metal skins that form outer and inner walls 52 and 66 creates an assembly that has a large strength to weight ratio. Thus, structure 58 not only has the unique acoustical characteristics needed for operation of the invention but also provides these characteristics without an accompanying weight penalty.

With reference to FIGS. 3 and 4, acoustical liner structure 104 of sleeve 28 is fabricated in a manner similar to structure 58 of plug 30. The metal skins that provide walls 100 and 106, and honeycomb core 108 are separately formed and then assembled and bonded together by means such as brazing. The perforations in walls 100 and 106 are formed by die punching prior to their assembly with core 108.

The size and spacing of the peforations in wall 100 and wall 106, and other dimensions of the structural parts that make up sleeve 28 will vary depending upon the particular configuration of the nozzle in which the sleeve is used and the frequency ranges of the core noise and turbine noise that are to be attenuated. For a nozzle 11 having the above exemplary dimensions for plug 30, and a sleeve 28 having an overall axial length of approximately 44.5 inches between aft end 32 and forward end 46, an axial length of 33.0 inches for liner structure 104, a radius of inner wall 100 measured at the forward end of approximately 20 inches, and a frusto-conical wall 102 converging toward the centerline of the nozzle at 12°, liner structure 104 had the following exemplary dimensions. Honeycomb core structure 108 was 0.35 inches thick, the cells of the honeycomb were ⅜ inches square, the perforations in wall 100 were of a uniform POA of 19% with holes of 0.030 inches in diameter, and the perforations in wall 106 had a POA of 8% with holes of 0.030 inches in diameter. As a result of these specifications, cavities 120-134 are tuned to the core noise frequency range of 200-800Hz, and structure 104 couples core noise into these cavities and at the same time acts as a quarter-wave absorber of turbine noise in the frequency range of 2000-8000Hz.

Figure 6:
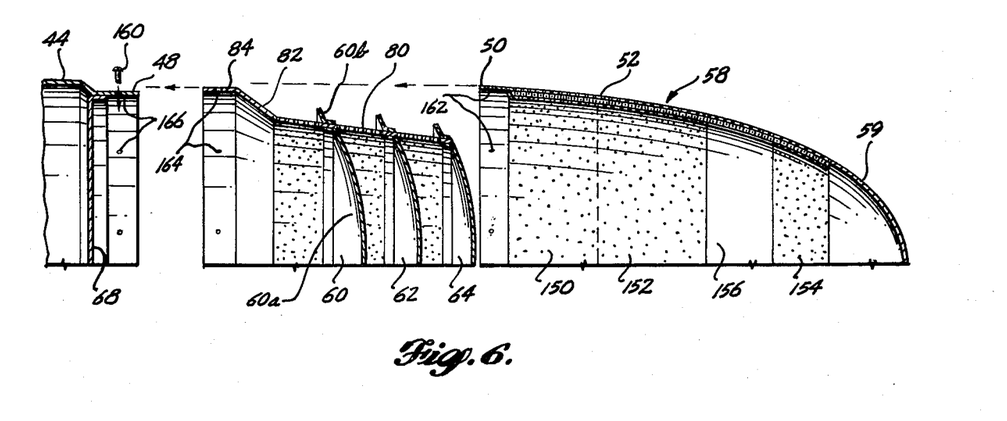
FIG. 6 is a partially exploded view of the plug of the nozzle assembly, illustrating the principal subassemblies of the plug and how they are interconnected.

With reference to FIG. 6, plug 30 is assembled and attached to engine 12 in the following manner. Liner structure 58 and attached end piece 59 form one subassembly. Support 80 and partitions 60, 62 and 64 form a second subassembly. These two subassemblies are then mounted to the hub fairing 44 of engine 12 by first sliding cylindrical flange 84 of structure 80 over flange 48 of fairing 44 and then sliding cylindrical flange 50 of liner 58 over flange 84 so that flanges 50 and 84 are congruently disposed about flange 48. The entire assembly is then fastened together by means of bolts 160 that are passed through radially aligned mounting holes 162 and 164 on flanges 50 and 84, respectively and threadedly secured in threaded mounting holes 166 in flange 48.

Although not shown in a separate view, the mounting of sleeve 28 to engine 12 is similar to that of plug 30 in that sleeve 28 is formed in two subassemblies, one comprising liner structure 104 including walls 100, 106 and core 108 and the other comprising outer wall 102 including the plurality of annular partitions 110-115 attached thereto, wall 136 and an imperforate wall 101 that forms a rearward extension of inner sleeve wall 100.

These two subassemblies of the sleeve 28 are separately fastened to the axial end 42 of housing 35 by first bolting a circumferential flange 122 defined at the forward end of liner structure 104 to the axial end 42 of housing 36 by means of bolts 170. Then, the outer subassembly that includes wall 102 and the attached annular partitions 110-115 is slipped over the outer surface of wall 106 of structure 104 and a circumferential flange 103 at the forward end of wall 102 is fastened to the axial end 42 of housing 36 by means of bolts 172.

OPERATION

Figure 7:
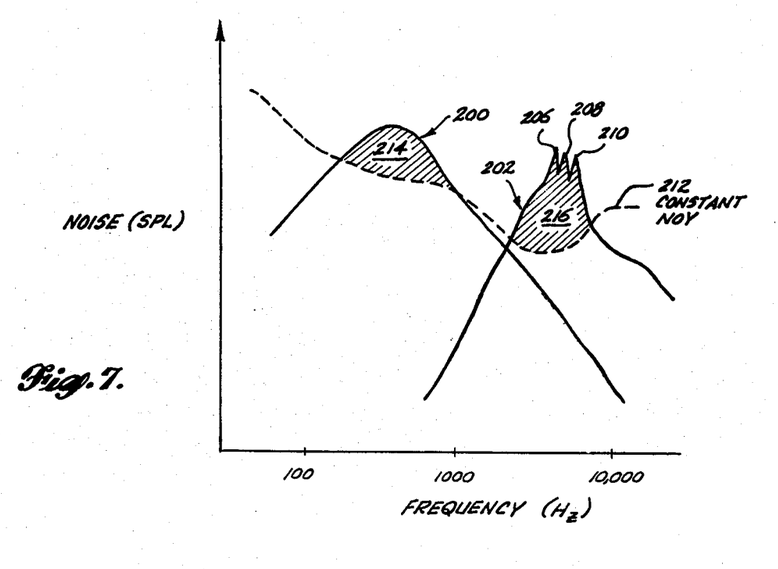
FIG. 7 is a graph of the spectral distribution of the core noise and the turbine noise together with a plot of a frequency dependent parameter that represents the sensitivity of the human ear to noise at various frequencies.

The highest intensities of the core noise and the turbine noise are attenuated as the exhaust gases are channeled through nozzle duct 26 (FIGS. 1 and 2) during operation of engine 12. The spectral distributions of the core noise and turbine noise existing in duct 26 are illustrated in FIG. 7 in which the intensity of the noise is represented along the vertical axis in units of SPL (sound power level) while the frequency is represented along the horizontal axis. The core noise spectrum 200 is essentially broadband with the highest intensity or peak level being usually concentrated in a frequency range of approximately 200 to 800Hz. The highest intensity or peak level of turbine noise is usually concentrated in a frequency range of approximately 2000 to 8000Hz as shown by turbine noise spectrum 202 which includes several sharply defined turbine tones indicated at 206, 208 and 210. Tones such as indicated at 206, 208 and 210 are inherent in the operation of turbines.

Superimposed on spectrums 200 and 202 is a dotted line 212 representing a plot of a noise rating parameter called constant NOY that represents a predetermined constant level of annoyance to the human ear caused by noise at different frequencies. As indicated, the intensity of the noise in units of SPL must be reduced in the higher frequency turbine noise range, relative to the lower frequency core noise range in order to maintain this constant NOY level. Turbine noise is particularly annoying to the human ear, and this is reflected by the drop in the plot of constant NOY level 212 as it passes through the turbine noise spectrum 202. Also, of two noise spectra having equal overall noise rating, i.e., the integral of level 212 over the frequency spectrum, the spectrum with prominent tones is the most annoying, requiring that level 212 be "tone corrected".

For best results, nozzle 11 is designed to absorb the noise energy shown in the shaded areas 214 and 216 of spectrums 200 and 202 respectively in order to drop the noise levels of the engine's exhaust down to the level of line 212 that represents a predetermined constant NOY that has been found to be tolerable to most people.

In order to obtain this result, the perforations in the walls of structures 58 and 104 that define duct 26, namely walls 58 and 100, are selected to provide a POA that passes noise energy in both the core noise (e.g., 200-800Hz) and turbine noise (e.g., 2000-8000Hz) frequency ranges. The other walls of structures 58 and 104, namely walls 66 and 106, respectively, are perforated so as to have POAs that satisfy two requirements. First, the POAs of walls 66 and 106 must be small enough so that structures 58 and 104 act as quarter wave type absorptive linings for sound energy at turbine noise frequencies. Secondly, the POAs of walls 66 and 106 must be large enough to cooperate with the perforations in walls 52 and 100 so that for the relatively lower core noise frequencies, i.e., the peak concentrations in core noise spectrum 200, these perforations cofunction with the interior Helmholtz cavities to cause absorption of core noise.

The particular POAs of the walls of liner structures 58 and 104 are initially selected by theoretical calculations and/or modelling using known acoustical analysis and are then refined by trial and error testing to obtain optimum attenuation of the unwanted noise frequencies. While the particular dimensions and POAs of the perforated walls of structures 58 and 104 will vary depending upon numerous design characteristics of the nozzle, the previously specified dimensions for the nozzle 11 disclosed herein have proved successful in achieving needed attenuation of both turbine and core noise.

In fact, it has been found that nozzle 11 constructed in this manner is somewhat more effective in attenuating turbine and core noise that would be expected solely from the acoustical properties of plug 30 and sleeve 28. It is believed that this added attenuation is due to the cooperative effect of the perforations along the walls 52 and 100 of duct 26 and of the interior quarter wave and Helmholtz cavities in communication with such perforations which together tend to convert a significant portion of the rearwardly propagating sound waves in the exhaust into sound waves having radially directed velocity components. The latter sound waves are more readily coupled into liner structures 58 and 104 and into the interior Helmholtz cavities of plug 30 and sleeve 28 for absorption. The honeycomb core structures 65 and 108 of liner structures 58 and 104 are especially effective in this regard. The cells of the honeycomb convert the sound waves into wave planes propagating radially into the interior Helmholtz cavities. Planar waves entering the cavities in this manner are more effectively dissipated.

ALTERNATE EMBODIMENT OF THE NOZZLE PLUG

Figure 8:
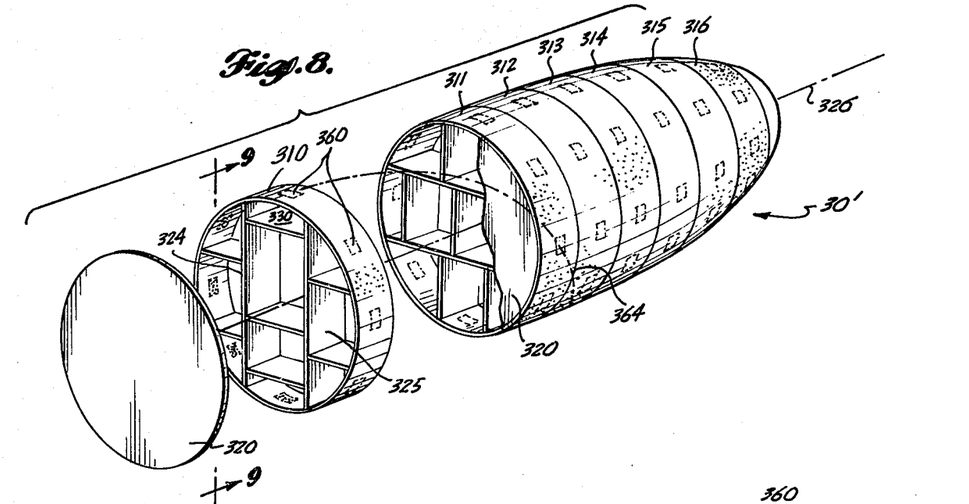
FIG. 8 is a partially exploded view of an alternative embodiment of a plug for the nozzle assembly of FIG. 1.
Figure 9:
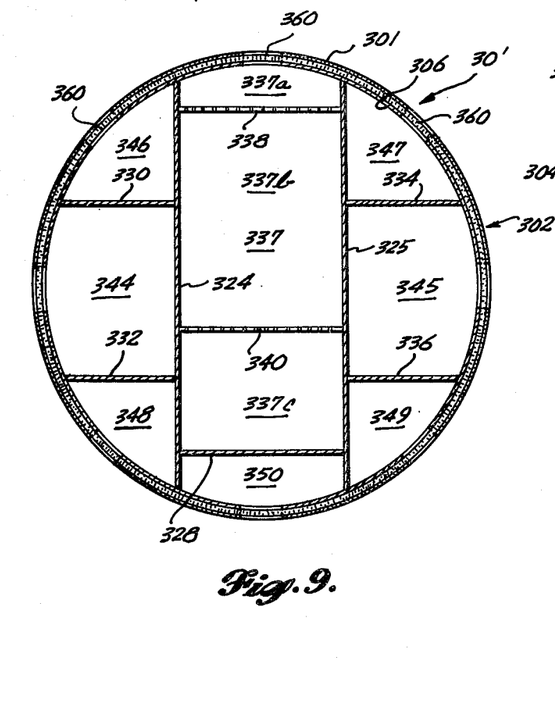
FIG. 9 is a transverse sectional view of the plug shown in FIG. 8 taken along section line 9—9 of FIG. 8.
Figure 10:
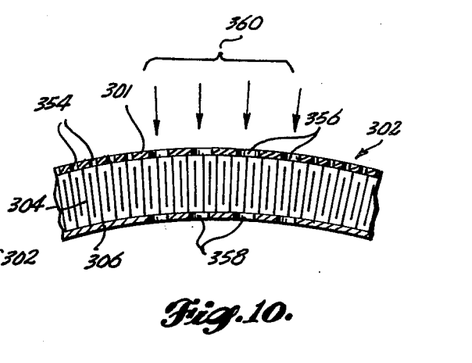
FIG. 10 is a detail view of a double wall liner structure forming part of the plug shown in FIG. 8.

With reference to FIGS. 8-10, a plug 30' is shown which embodies the principles of the invention and which can be used in a nozzle of the type shown by nozzle 11 of FIGS. 1-6. In this embodiment, plug 30' includes an exterior wall 301 (FIGS. 9 and 10) that is provided by an outer metal skin of a double wall acoustical liner structure 302 that includes in addition to wall 301, a lightweight metal honeycomb core structure 304 and a radially inner metal skin forming an inner wall 306. Walls 301 and 306 are assembled together with core structure 304 and bonded together by brazing to form a unitary structure similar to liner structure 58 of plug 30 described above.

Walls 301 and 306 are perforated in a manner described more fully below to provide both quarter wave absorption of the turbine noise and to couple the relatively lower frequency core noise from the nozzle duct into interior Helmholtz cavities that act as dissipative Helmholtz resonators.

The body of plug 30' is divided into a plurality of cylindrical sections 310, 311, 312, 313, 314, 315 and 316 each circumferentially bounded by a ring-like section of liner structure 302. Each of sections 310-316 defines a hollow interior that is bounded by the inner surface of inner wall 306 of structure 302 and by axially spaced apart walls 320 that extend transversely of plug 30' and are disposed between each adjacent pair of sections 310-316 and at the forward end of the forwardmost section 310 and, although not shown, at the aft end of section 316.

This hollow region within each of sections 310-316 is divided by a plurality of planar partitions. Using section 310 as an example, the planar partitions include a first pair of vertically disposed partitions 324 and 325 extending in spaced apart parallelism and parallel to and on opposite sides of an axis 326 of the plug. A horizontal partition 328 extends transversely between partitions 324 and 325 and is located between axis 326 and the lowermost portion of structure 302. A second pair of planar partitions 330 and 332 extend in spaced apart parallelism and transversely to partitions 324 and 325, from a side of partition 324 remote from the plug axis 326 and to inner wall 306 of structure 302. A third pair of planar partitions 334 and 336 extend in spaced apart parallelism, transversely to partitions 324 and 325 from a surface of partition 325 remote from plug axis 326 outwardly to inner wall 306 of liner structure 302.

Partitions 330-336 are solid wall partitions. These solid-wall partitions 330-336 together with walls 320 and wall 306 of structure 302 form like-sized pairs of Helmholtz cavities 344 and 345, 346 and 347, 348 and 349 and a single Helmholtz cavity 350. Each of the additional cylindrical sections 311-316 of plug 330 have a similar set of interior partitions dimensioned in each case to conform to the girth of the particular plug section.

In addition to these partitions, a sound-absorbing Helmholtz cavity 337 bounded by partitions 324 and 325, partition 328, walls 320 and wall 306 is further divided by a pair of horizontal, spaced-parallel, perforated partitions 338 and 340. Cavity 337 is thereby divided into a series of three subcavities 337a, 337b and 337c, each of which is tuned to a different frequency range that in part depends on the placement and POAs of partitions 338 and 340.

Outer wall 301 of liner structure 302 includes perforations that define two different POAs. Most of the surface area of wall 301 is uniformly perforated as indicated at 354 to define a relatively small POA. Those portions of inner wall 306 in radial registration with perforations 354 is imperforate, so that in these cases, structure 302 functions solely as a quarter wave absorptive liner tuned to absorb the relatively higher frequency turbine noise energy in a manner known per se.

To pass the relatively lower frequency core noise energy into Helmholtz cavities 337a-c and 344-350, the walls 301 and 306 of liner structure 302 are perforated at 356 and 358 with relatively large POAs to form virtual ports 360 that are substantially transparent to sound energy in the core noise frequency range.

Thus, each of plug sections 310-316 absorbs the turbine noise in liner structure 302 and absorbs the core noise in the variously sized and low-frequency tuned Helmholtz cavities 337a-c and 344-350. In this manner it is noted that each cylindrical plug section, such as section 310, has a circumferential array of ports 360, each communicating with a different sized Helmholtz cavity and thus serving to extract different core noise frequency components from the exhaust noise.

Since each of ports 360 and their associated interior cavities are effective over a limited circumferential region of plug 30', the various plug sections 310-316 are rotated relative to one another to dispose the orientation of the ports 360 and associated interior partitions at different angles of rotation about the plug axis. In this manner, the noise attenuating characteristics of plug 30' can be tailored to the noise suppression that is needed for a particular nozzle. In the present embodiment, sections 310-316 are rotated in a spiralling fashion commencing with the orientation of the partitions for section 310 as shown in FIG. 9 and rotating each successive section by 90°. Thus, in FIG. 8, those ports of the various sections that are intercepted by the rearwardly spiralling dotted liner 364 communicate with the cavity corresponding to cavities 337*a–c* of section 310 in FIG. 9. The spiral makes about 1½ revolutions about the circumference of plug 30' so that noise energy in the frequencies to which cavities 337*a–c* are tuned are extracted in regions that are arrayed about the entire circumference of the plug. To provide substantially equal frequency attenuation characteristics in corresponding cavities of the various plug sections 310–316, the diameter of plug 30 is maintained fairly uniform throughout its length so that, for example, all of those cavities that have the same geometry in at least sections 311–315 are tuned to substantially the same core noise frequencies.

In some cases, it may be desirable to provide a non-circumferentially uniform attenuation of the various core noise frequencies and in such cases, the sections 310–316 of plug 30' will be oriented relative to the plug axis so that the absorbtion characteristics of the plug are directional. For example, it may be desirable to effect the greatest amount of attenuation of core noise that emanates from the lower circumferential portions of the annular nozzle duct. Noise emanating from this region may in some cases be more intense when perceived from ground level, and thus by more strongly attenuating the core noise from this portion of the nozzle duct the annoyance level on the ground may be even further reduced.

ALTERNATIVE EMBODIMENT OF THE NOISE ATTENUATING NOZZLE FOR A MIXED-FLOW EXHAUST

Figure 11:
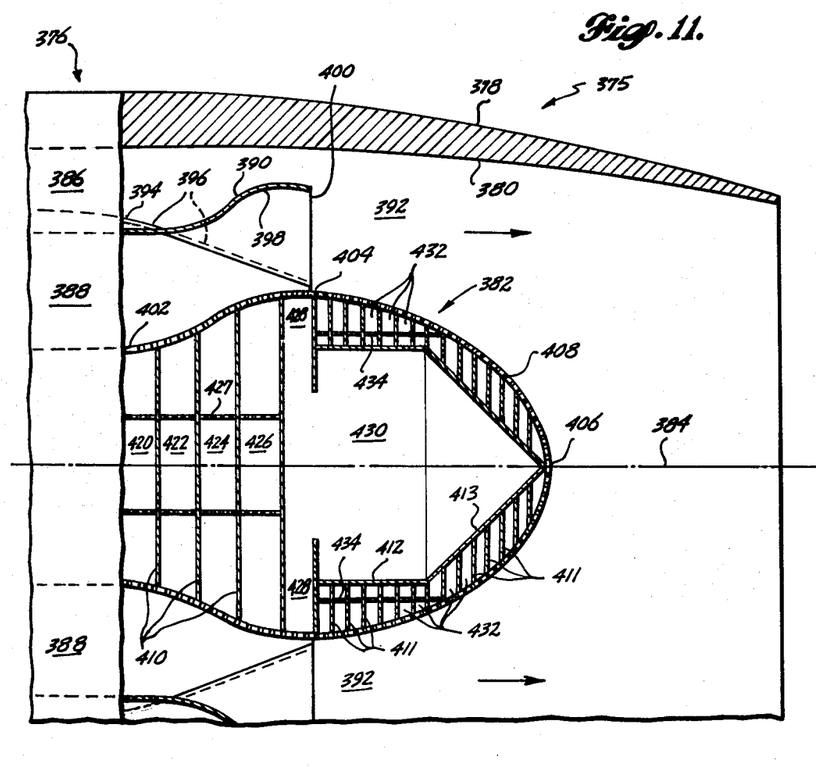
FIG. 11 is a diagrammatic view, in longitudinal, vertical section of an alternative embodiment of a noise attenuating nozzle assembly of the invention for a mixed-flow exhaust nozzle.

With reference to FIG. 11, a mixed-flow exhaust nozzle 375 is provided for attachment to a fan ducted turbojet engine of which only the aft end 376 is shown. In this embodiment, nozzle 375 includes an outer generally cylindrical sleeve 378 having an inner surface 380. A round plug 382 of circular cross-section is arranged such that its axis 384 is coaxial with sleeve 378 and plug 382 and sleeve 378 are attached to the aft end 376 of the engine to receive and mix fan flow discharged from an annular fan duct 386 and core flow discharged from an annular turbine outlet 388.

A generally annular-shaped, corrugated mixer 390 is coaxially arranged within an annular nozzle duct 392 defined between plug 382 and an inner surface 380 of sleeve 378 to promote rapid mixing of the fan and core flows within the confines of the nozzle 375. Mixer 390 is generally of the type disclosed in U.S. Pat. No. 3,655,009, issued to Hilbig on Apr. 11, 1972. As disclosed therein, mixer 390 has a generally circular forward end 394 attached to axial end 376 of a cylindrical wall of the engine that separates the fan duct 386 from the turbine outlet 388. The wall of mixer 390 is formed with corrugations that extend parallel to the center line of the nozzle and increase in depth (radial dimension) in the aft direction. These corrugations form a circumferential array of fan flow channels that are defined between wall 380 of sleeve 378 and the radially outwardly facing surface areas 396 of mixer 390 that form the valleys of the corrugations. Similarly, a circumferential array of core flow channels are defined between plug 382 and the radially inwardly facing surface areas 398 of mixer 390 by the hills that alternate with the valleys. Confluence of the fan and core flows commences at a transverse mixing plane lying at the aft end 400 of mixer 390.

Plug 382 is generally bulb-shaped with a neck portion adjacent a forward truncated end 402. From end 402 plug 382 flares outwardly at increasing rearward distances along axis 384, reaching a maximum diameter at girth 404 which lies in radial alignment with the aft end 400 of duct 390. Thereafter, plug 382 tapers rearwardly and converges on axis 384 at a rounded end 406.

An outer wall 408 of plug 382 is perforated. The hollow interior of the plug that is bounded by the inner surface of wall 408 is divided into a plurality of various sized sound-absorbing cavities by coaxially arranged disc-shaped partitions 410, annular-shaped partitions 411, a cylindrical partition 412 and a conical partition 413.

Disc-shaped partitions 410 are arranged coaxially and in spaced-apart relation with a forward portion of plug 382 that is in radial registration with mixer 390 and partitions 410 define therein a set of relatively large sound-absorbing cavities 420, 422, 424 and 426. By this arrangement, the core noise that is concentrated in the core flow from turbine outlet 388 is immediately subjected to the sound-attenuating effects of cavities 420–426 prior to the mixing of the core noise with the fan noise at the end 400 of mixer 390. Additionally, the rearmost one of disc-shaped partitions 410 and the forwardmost one of annular partitions 411 define an entry 428 communicating with an even large sound-absorbing cavity 430 that is tuned to the lowest frequency components of the core noise spectrum.

Cavities 420–426 are further divided by cylindrical, perforated partitions 427 that are arranged in the forward portion of plug 382 coaxially with and axially between partitions 410. Partitions 427 thus divide cavities 420–426 into inner central portions and radially outer annular portions resulting in cavities having two degrees of freedom, as will be recognized by those skilled in the art of acoustics. In this case, the outer annular portions of cavities 420–426 serve as impedance matching means for coupling core noise energy into the center portions of cavities 420–426.

Cavity 430 is defined by cylindrical partition 412 and conical partition 413 which are arranged coaxially within the plug with the apex of partition 413 adjacent end 406 of the plug and the forward end of partition 412 abutting against the forwardmost annular partition 411. It is noted that entry 428 to cavity 430 is located forward of the aft end 400 of mixer 390 so as to capture the highest concentrations of the core noise along with cavities 420–426.

The remaining interior volume of plug 382 that is defined aft of end 400 of mixer 390 is divided into a plurality of relatively small cavities by annular partitions 411 which are arranged in spaced apart relation with their outer edges adjacent wall 408 and by the exterior surfaces of cylindrical partition 412, conical partition 413, and by the interior surface of perforated wall 408. These cavities are turned to the relatively higher frequencies of the turbine noise and are positioned to absorb such noise from the core flow after it has been mixed with the fan flow. The fan flow includes noise components that are embraced by the same frequency range that includes the turbine noise, and for this reason the sound-absorbing cavities formed by partitions 411 also attenuate some of the fan noise.

Depending upon the frequencies that are to be attenuated, at least some of the cavities 432 may be further divided by cylindrical, coaxially arranged perforated partitions 434 that in effect divide each of these cavities into radially inner annular portions and radially outer annular portions, and as in the case of perforated partition 427, yields cavities having two degrees of freedom.

The radially outer portions of those cavities 432 divided by partitions 434 serve in this case as an impedance-matching means for coupling predetermined frequencies of the turbine noise into the radially inner portions of the cavities.

While only a limited number of embodiments of the invention have been disclosed above, it will be readily apparent to persons skilled in the art that numerous changes and modifications can be made to the disclosed embodiments without departing from the spirit of the invention as defined in the following claims.

What is claimed is:

1. In a noise attenuating nozzle assembly for a turbojet propulsion engine having an annular, core-exhaust port and in which said nozzle assembly is of the type having an annularly-shaped sleeve that has an inner wall surface, and further having a plug that has a central axis and an outer wall surface of generally circular transverse section, said plug being mounted substantially coaxially within said sleeve so as to define an annular, core-exhaust duct between the inner wall surface of said sleeve and the outer wall surface of said plug, said sleeve and said plug having forward ends adapted for attachment to such engine so that said annular duct forms a rearward extension of the engine's annular core-exhaust port through which exhaust gases and associated core and turbine noise energy are rearwardly ducted, the improvement in said nozzle assembly comprising:

acoustical structure integrated into said plug and including an acoustical liner having a perforated, outer wall defining the outer wall surface of said plug, and having a perforated inner wall spaced equidistantly inwardly from said outer wall, and core means sandwiched between said outer and inner walls for transmitting noise energy therebetween in directions oriented radially of said central axis of said plug;

said inner wall bounding a generally hollow interior of said plug and said acoustical structure further including partitioning means disposed inside of said plug for dividing the interior of said plug bounded by said inner wall into a plurality of Helmholtz sound absorbing resonant cavities; and perforations in said outer wall and said core means of said acoustical liner being dimensioned so that said acoustical liner is a quarter wave absorber of noise energy within a first predetermined frequency range that substantially embraces said turbine noise energy, and perforations in said inner wall being dimensioned so that said acoustical liner cofunctions with said Helmholtz cavities to couple noise energy that exists within a second predetermined range of frequencies that substantially embraces said core noise energy from said duct through said acoustical liner and into said Helmholtz cavities for absorption thereby.

2. In the noise attenuating nozzle assembly of claim 1, wherein said partitioning means comprises a plurality of disc-shaped partitions disposed coaxially and in axially spaced apart relationship within the hollow interior of said plug bounded by said inner wall of said acoustical liner so that noise energy from said duct passes radially into each of said Helmholtz cavities through that portion of said liner that circumferentially surrounds each such cavity.

3. The nozzle assembly of claim 2 further comprising an acoustically transparent structural support means for supporting said disc-shaped partitions, said acoustically transparent structural support means having a forward end congruently disposed with a forward end of said outer wall of said plug and being adapted for attachment to said engine along with said forward end of said outer wall of said plug.

4. The nozzle assembly of claim 3 wherein said acoustically transparent structural support means has a generally frusto-conical shape and is arranged with its larger diameter end as said forward end.

5. The nozzle assembly of claim 4 wherein each of said disc-shaped partitions include an inner section and a radially outer section, said inner sections of said disc-shaped partitions being affixed to an inner surface of said acoustically transparent structural support means and said radially outer sections being of annular shape and being affixed to an outer surface of said acoustically transparent structural support means.

6. The nozzle assembly of claim 3 wherein said disc-shaped partitions are dimensioned and arranged so that a gap is formed between the radially outermost edges of said disc-shaped partitions and the partitioning means that defines said first plurality of separate sound-absorbing cavities.

7. The nozzle assembly of claim 2 wherein said core means disposed between said outer wall of said plug and said inner wall of said plug comprises an open cell honeycomb core structure arranged to transmit sound energy between the perforations in said outer wall and the perforations in said inner wall.

8. The nozzle assembly of claim 2 wherein at least a certain area of said outer wall of said plug has perforations defining a percentage open area that is greater than a percentage open area defined by perforations of said inner wall lying in an area in radial registration with such certain area of said outer wall.

9. In the nozzle assembly of claim 1, the improvement in said nozzle assembly is further defined by said sleeve having a radially outermost wall that is imperforate, and said sleeve having an additional acoustical structure including an acoustical liner disposed radially inwardly from said imperforate outermost wall so as to define a hollow interior of said sleeve, said acoustical liner including a perforated inner wall defining said inner wall surface of said sleeve, a perforated outer wall spaced equidistantly outwardly from said inner wall and a core means sandwiched between said inner and outer walls of said acoustical liner of said sleeve for transmitting noise energy in directions oriented radially of the axis of said sleeve, and said additional acoustical structure further including partitioning means disposed inside of said hollow interior of said sleeve for dividing said interior of said sleeve bounded by said outermost wall and said acoustical liner into a plurality of Helmholtz sound absorbing resonant cavities; and said perforations in said inner wall of said liner of said sleeve and said core means of said liner of said sleeve being dimensioned so that said liner of said sleeve is a quarter wave absorber of noise energy within said first predetermined frequency range, and said perforation in said outer wall of said liner of said sleeve being dimensioned so that said liner of said sleeve cofunctions with said Helmholtz cavities of said sleeve to couple noise energy existing within said second predetermined range of frequencies from said duct through said liner of said sleeve and into said Helmholtz cavities of said sleeve for absorption thereby.

10. The improvement in said nozzle assembly of claim 9 wherein said partitioning means of said sleeve comprises a plurality of annular partitions arranged coaxially and in axially spaced relationship within said sleeve so that noise energy from said duct passes radially into each of said Helmholtz cavities defined within the interior of said sleeve and through that portion of the liner of said sleeve that circumferentially surrounds each such Helmholtz cavity.

11. The nozzle assembly of claim 10 wherein said annular partitions in said sleeve are affixed to said additional wall of said sleeve.

12. The nozzle assembly of claim 11 wherein said annular partitions in said sleeve are dimensioned and arranged so that a gap is formed between the radially innermost portions of said annular partitions and the outer surface of said outer wall of said sleeve.

13. A noise attenuating nozzle for a turbofan engine having annular-shaped, concentrically arranged fan and core-exhaust ports, comprising:
 a hollow generally cylindrical sleeve, an elongate plug having an exterior that is generally rounded about the axis of elongation, and a generally annular-shaped mixer duct, said plug being coaxially disposed within said sleeve to define therewith an annular duct, and said mixer duct being coaxially disposed between said plug and said sleeve, said sleeve, plug and mixer duct having forward ends adapted to connection to the engine such that discharges from said fan and core-exhaust ports are ducted rearwardly and mixed within said annular duct at an aft terminus of said mixer duct;
 said plug having an outer wall and a hollow interior and having first and second solid wall partitions arranged for partitioning said hollow interior into first and second sets of sound energy absorbing cavities, said first set of cavities being tuned to a first range of frequencies of said sound energy and said second set of cavities being tuned to a second range of frequencies of said sound energy;
 said outer wall having first perforated portions located on said plug forward of said aft terminus of said mixer duct for coupling sound energy existing in the core-exhaust into said first set of cavities, and said outer wall having second perforated portions located on said plug aft of said mixer duct for coupling sound energy existing in the mixed fan air and turbine core-exhausts into said second set of cavities, said first range of frequencies generally embracing core noise and said second range of frequencies generally embracing fan noise.

14. In a noise attenuating nozzle assembly for a turbojet propulsion engine having an annular, core-exhaust port and in which said nozzle assembly is of the type having an annularly-shaped sleeve that has an inner wall surface, and further having a plug that has a central axis and an outer wall surface of generally circular transverse section, said plug being mounted substantially coaxially within said sleeve so as to define an annular, core-exhaust duct between the inner wall surface of said sleeve and the outer wall surface of said plug, said sleeve and said plug having forward ends adapted for attachment to such engine so that said annular duct forms a rearward extension of the engine's annular core-exhaust port through which exhaust gases and associated core and turbine noise energy are rearwardly ducted, the improvement in said nozzle assembly comprising:
 acoustical structure integrated into said plug and including an acoustical liner having a perforated, outer wall defining the outer wall surface of said plug, and having an inner wall spaced equidistantly inwardly from said outer wall, and core means sandwiched between said outer and inner walls for transmitting noise energy therebetween in directions oriented radially of said central axis of said plug;
 said plug having a substantially uniform diameter versus axial dimension and said plug being segmented into a plurality of generally hollow cylindrical plug segments each circumferentially bounded by a ring-shaped section of said acoustical liner and together being arranged end-to-end and the interior of each such plug segment being separated from the interior of adjacent plug segments by transversely oriented, imperforate walls;
 a plurality of planar partitions disposed within the interior of each plug segment dividing said interior into a plurality of Helmholtz cavities that are bounded by separate partial circumferential portions of the associated ring-shaped section of said liner of each plug segment, each said portion of said section of said liner having an acoustical port formed therein and passing through said outer wall, said core means and said inner wall for coupling core noise energy into the Helmholtz cavity bounded by such liner portion, and said outer wall of said sections of said liner being perforated to cofunction with said inner wall and said core means as a quarter wave absorber of turbine noise energy; and
 said planar partitions being sized and arranged so as to form different size Helmholtz cavities within each plug segment so that the cavities formed thereby have substantially the same geometry as the cavities in each of the other said plug segments, said plug segments being disposed at different angles of rotation about said axis of said plug to provide different circumferential orientations of said acoustical ports and the associated different size Helmholtz cavities with respect to the core exhaust port of the engine.

* * * * *